WIRELESS EXTENSION TELEPHONE

Filed Aug. 7, 1961 2 Sheets-Sheet 1

EXTENSION UNIT 100

INVENTORS.
ROBERT V. BURNS
ROBERT T. CLEARY
BY C. A. Gulbrandsen
ATTY.

July 6, 1965 R. V. BURNS ETAL 3,193,623

WIRELESS EXTENSION TELEPHONE

Filed Aug. 7, 1961 2 Sheets-Sheet 2

BASE UNIT 200

INVENTORS.
ROBERT V. BURNS
ROBERT T. CLEARY
BY C. A. Gullbrandsen
ATTY.

United States Patent Office
3,193,623
Patented July 6, 1965

3,193,623
WIRELESS EXTENSION TELEPHONE

Robert V. Burns, Markham, and Robert T. Cleary, Lockport, Ill., assignors to Automatic Electric Laboratories, Inc., Northlake, Ill., a corporation of Delaware
Filed Aug. 7, 1961, Ser. No. 129,611
18 Claims. (Cl. 179—41)

This invention relates to telephone systems and particularly to a subscriber's extension telephone that includes a wireless link between the telephone instrument and a conventional telephone line enabling a subscriber to relocate the telephone instrument at will and still make and receive telephone calls in a conventional manner.

Since the invention of the telephone personal communication between individuals has grown so that the majority of families in the United States all have telephone service. Rather than reach a saturation point when each family is equipped with a single telephone the trend has continued so that at present many families are supplied with not one but with several telephones for use in their homes.

The use of the second, third, etc., telephones as extension phones throughout the home has become increasingly widespread. Previously when only one telephone was installed in a home a central location for this instrument was chosen. However, no single location could be perfect and as a result frequently the housewife while performing her daily chores would be forced to come some distance, particularly in a large home, to the location of the telephone either to make or receive a telephone call. Likewise if the inhabitants of the home were to be in the yard, porch, basement, etc. the lack of proximity of a telephone instrument would result in extra steps and frequently the possible missing of a telephone call if the person were unable to respond by removing the handset from the telephone instrument within a reasonably short period of time after the ringing signal announcing an incoming call commenced.

Several solutions to this problem have been proposed. Among these are the use of many extensions placed in convenient locations throughout the area. The other is the use of a multiplicity of telephone line jacks allowing the subscriber to move the telephone from one location to another to be within easy access. Still another is the use of long extension cords to connect the telephone instrument to its terminal, allowing limited freedom in relocating the telephone.

All of these solutions lack complete flexibility since the location of the extension telephone or the extension jack may be useful at times, but still on many occasions will be inadequate. In the so-called trend towards outdoor living today, the housewife or other members of the family are frequently required to go from the garden or the patio to the nearest telephone to answer it. In many cases this may be a considerable distance.

The most satisfactory solution to the extension telephone problem lies in the use of a telephone extension instrument that requires no wire connections between the instrument and the telephone line. An instrument such as this utilizing a radio link between terminal equipment connected to the telephone line and the instrument itself would allow the subscribed to take the instrument any place within a specified range of the telephone line terminal equipment located in his home and permit him to both receive and make telephone calls. Such a wireless extension telephone could be taken to the garden, patio, basement, upstairs, downstairs, placed in any room of the house where convenient as well as possibly even carried with the subscriber while visiting a neighbor so that incoming telephone calls would not be missed and so that they might be rapidly answered without considerable moving about on the part of the subscriber.

The advantages a wireless telephone subscriber's instrument would present to subscribers, particularly the housewife, is readily apparent. However, it should be pointed out further that this same type of instrument would find considerable use in restaurants and other commerical establishments where the person to whom an incoming call is directed could have the telephone brought to him for answering without the necessity for intervening extension cords, or other connections. Certainly the number of possible uses for a wireless extension telephone are limited only by the imagination of the user.

Accordingly the object of the instant invention is the provision of a subscriber's extension telephone instrument that requires no physical connection to the telephone line.

A first feature of the invention is the usage of locally generated tone signals as a means of control between an extension unit and its associated base station.

A second feature is the provision of a wireless telephone system operating on two channels to prevent interference and reduce cost.

Another feature of the instant invention is the provision of wireless transmitter and receiver circuitry and associated control circuitry that may be utilized in a conventionally styled subscriber's instrument.

Figure 1:
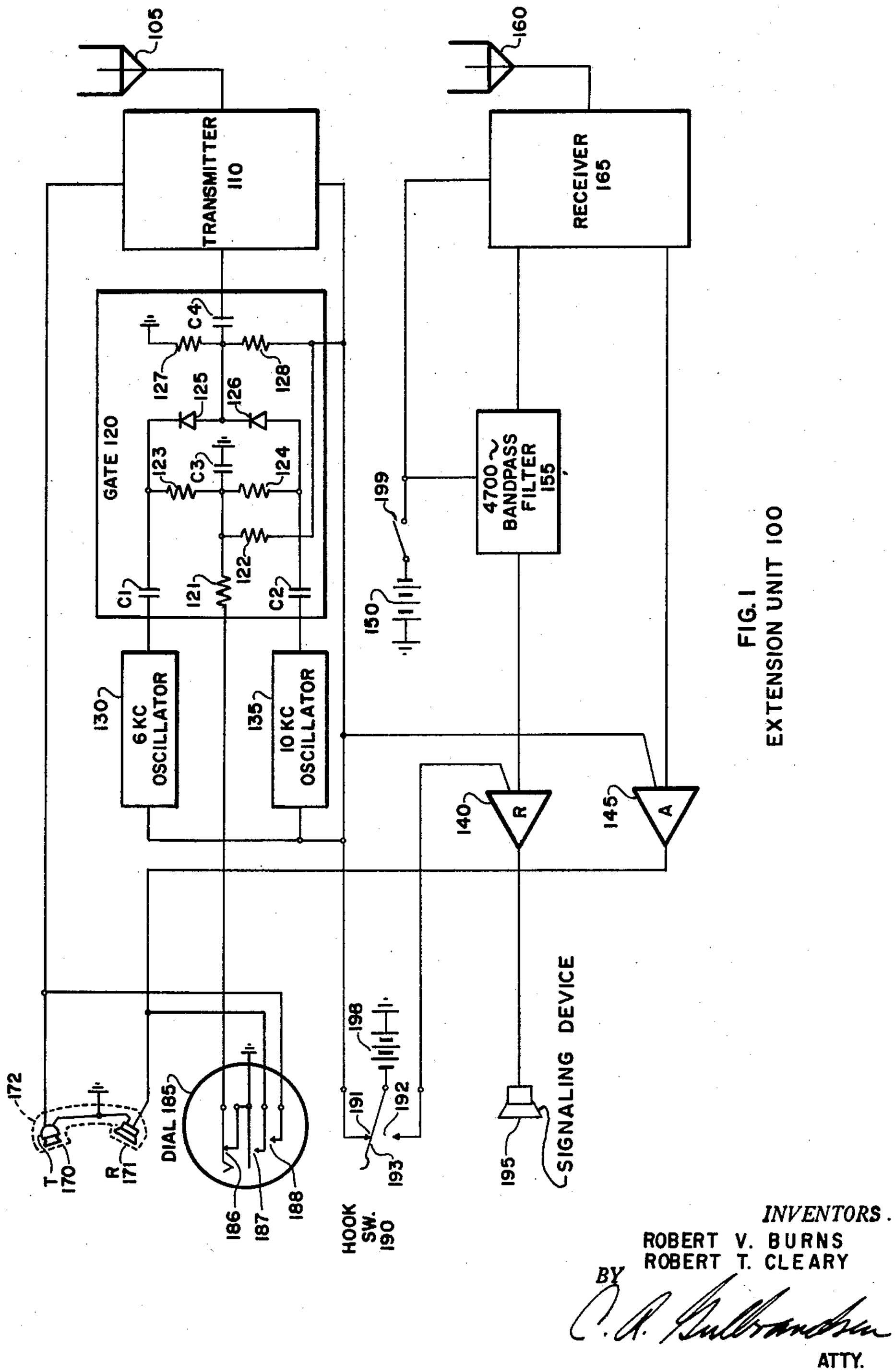
FIGURE 1 is a combination block and schematic diagram of a subscriber's telephone wireless extension unit in accordance with the instant invention.
Figure 2:
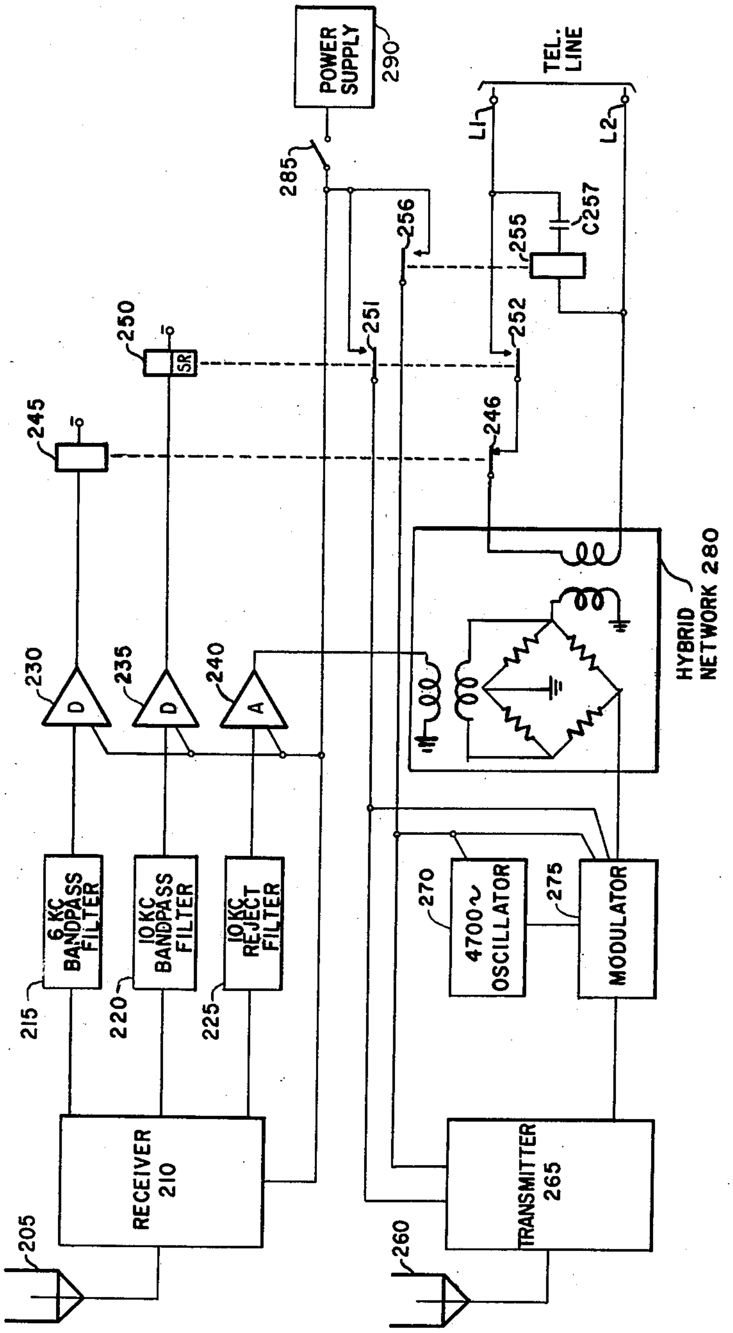
FIGURE 2 is a block diagram of a base unit for use in a subscriber's wireless telephone in accordance with the present invention.

Referring now to FIGURES 1 and 2 in combination, an incoming call to the wireless subscriber's extension unit from the central office will be traced first. Power switch 285 is operated to place the base unit in service. This switch is usually left in the operated position. Alternately it could be eliminated. As a battery conserving measure power switch 199 in the wireless extension unit is usally left in the open position until such time as the extension unit is placed in service. At this time battery from dry cell 150 is extended over power switch 199 to extension unit receiver 165 and to 4700 cycle band pass filter 155. Ringing signal driver 140 is also actuated from battery 198 over hookswitch 190. Hookswitch 190 is shown in the "off-hook" position, however at this time, hookswitch 190 will be in the "on-hook" position and the battery will be extended over spring 193 and contact 192 to the ringing signal driver 140.

When the base unit 200 was placed in service by operation of power switch 285 power was extended to base unit receiver 210, relay drivers 230, 235, and audio amplifier 240. Upon receipt of ringing current from the central office over the telephone line (conductors L1 and L2), A.C. ring relay 255 operates at its contacts 256. Battery from the power supply is extended over contacts 256 to base unit transmitter 265, local oscillator 270, and modulator 275. The application of battery to the local oscillator 270 causes it to produce a 4700 cycle audio tone. This tone is extended to modulator 275 where it is utilized to impress the 4700 cycle audio tone on the radio frequency signal generated by transmitter 265. The modulation arrangement used may be of any form such as amplitude modulation, frequency modulation etc. The modulated radio frequency signal is then radiated by a base unit transmitting antenna 260.

The RF signal from the base unit transmitter 265 is received at the extension unit receiving antenna 160 and conducted to receiver 165 which was previously placed in service. Since both the 4700 cycle bypass filter 155 and signal driver 140 are also in service and the incoming signal is 4700 cycle tone, receiver 165 detects this signal and extends the audio signal through bypass filter 155 to ringing signal driver 140 and converts the incoming 4700 cycle audio tone into a signal for use in powering signal device 195. This signal device may be of any form such as light, buzzer, horn, bell etc. The signal conversion done by signal driver 140 will of necessity be dependent upon the form of signal device 195 utilized at the wireless extension. In a practical embodiment of the instant invention signal driver 140 converted the incoming 4700 cycle tone to direct current for use in powering a local oscillator connected to a small transducer mounted in the base of the wireless extension unit.

Upon noting the operation of signal device 195 the subscriber at extension unit 100 removes handset 172 including transmitter 170 and receiver 171 from hook-switch 190 in the usual manner. Removal of the handset from the hookswitch removes battery from signal driver 140 and applies the same battery over contact 191 to voice signal audio amplifier 145, line pulsing signal (6 kc.) oscillator 130, line seizure signal (10 kc.), oscillator 135, gate circuit 120 and extension unit radio transmitter 110. With the application of power from battery 198 the foregoing units are placed in operation. Line seizure signals from 10 kc. oscillator 135 are conducted through the gate 120 to transmitter 110. Ten kc. signals are passed through the gate because diode 126 is biased in the forward condition and diode 125 is back biased. Transmitter 110 then radiates an RF signal modulated by the 10 kc. signals. This signal of course is radiated from extension unit transmitting antenna 105.

The base unit receiving antenna 205 picks up the RF signal transmitted from the extension unit 100, converts the RF signal to an audio frequency signal and extends this 10 kc. line seizure signal through band pass filter 220 to line seizure relay driver 235. Relay driver 235 in turn extends operating potential to line seizure relay 250. Operation of slow-to-release line seizure relay 250 closes the telephone line (conductor L1) at its contact 252 through to hybrid network 280.

Upon operation of relay 250 a D.C. path now exists through the hybrid network between conductors L1 and L2 and back to the telephone central office. Completion of the loop will terminate the application of ringing current at the central office and upon termination of ringing signals from the central office, ringing signal repeating relay 255 will fall back. When relay 255 restores, power is removed at contacts 256 from transmitter 265, modulator 275 and 4700 cycle oscillator 270. However power now extends from the power supply 290 over contacts 251 to transmitter 265 and modulator 275. All of the necessary components for two-way conversation are now actuated and conversation may now commence.

The incoming voice signals are received over the telephone line coupled through hybrid network 280 and modulator 275, which modulates the radio frequency signals transmitted by transmitter 265. The radio frequency signals as modulated by incoming voice signals are received by receiver 165 amplified and extended by amplifier 145 to the receiving transducer 171, where they are heard by the subscriber at the extension unit 100. The subscriber's speech is converted into electrical energy by transmitting transducer 170. Voice signals from transducer 170 are extended to transmitter 110 and used therein to modulate the radio frequency signals generated by transmitter 110. The modulated signals transmitted by transmitter 110 at the extension unit will be received by base unit receiver 210 where they are extended through 10 kc. reject filter or trap, 225 and audio amplifier 240. Reject filter 225 attenuates any 10 kc. line seizure signals that are being radiated by transmitter 110. Voice signals from amplifier 240 are conducted through hybrid network 280 where they are coupled to the line (conductors L1 and L2).

Upon completion of the telephone call the subscriber at extension 100 replaces handset 172 on hookswitch 190 removing battery from 6 kc. oscillator 130, 10 kc. oscillator 135, gate 120 and transmitter 110. Because of removal of battery from these unit line seizure (10 kc.) signals will no longer be transmitted by transmitter 110 to the base unit. Upon the termination of signals from the extension unit transmitter, receiver 210 no longer is able to extend a 10 kc. signal to driver 235 to operate line seizure relay 250. After its slow-to-release interval relay 250 restores, opening the connection to the telephone line at contacts 252 and removing power from transmitter 265 and modulator 275 at contacts 251.

To place an outgoing call from extension unit 100, the subscriber thereat removes handset 172 from the hookswitch. This operation extends battery 198 over contacts 191 to line pulsing signal (6 kc.) oscillator 130, line seizure signal (10 kc.) oscillator 135, gate 120 and transmitter 110. It is assumed the extension unit 100 is still in service and that power switch 299 is closed to connect battery 150 to receiver 165 as well as band pass filter 155. In the manner noted before 10 kc. signals are extended from 10 kc. oscillator 135 through gate 120 to transmitter 110 and radiated therefrom at transmitting antenna 105.

Receipt of these line seizure signals at receiver 210 via antenna 205 at the base unit 200 causes the operation of relay 250 in the manner noted before. Operation of relay 250 connects the hybrid network 280 to the telephone line at contacts 252. Completion of the loop and the closure of contacts 252 will be affected to seize line equipment in any well known manner at the central office via the telephone line. Dial tone will be returned over the telephone line to hybrid network 280 and extended therefrom to modulator 275 where it will be utilized to modulate the radio frequency signals of base unit 265. The radio frequency signals radiated by transmitter 265 of transmitting antenna 260 will then be modulated in accordance with the dial tone returned from the central office. This signal will be received at receiving antenna 160, conducted to receiver 165 where the signal will be extended and amplified through audio amplifier 145 to the handset receiver.

Upon hearing dial tone the subscriber will proceed to dial. At the moment the dial swings off normal ground will be extended through the contacts 187 and 188 to receiver 171 and transmitter 170 to shunt these two units. As the dial returns to normal contacts 186 will be pulsed in the usual manner opening and closing ground to gate 120 at resistor 121. When ground is removed at this point diode 125 becomes biased in the forward direction to conduct a 6 kc. signal from line pulsing signal oscillator 130 through capacitor C4 to transmitter 110. At the same time the removal of ground effectively causes diode 126 to be back biased blocking the transmission of 10 kc. signals. Receiver 210 extends the 6 kc. signals through 6 kc. band pass filter 215 to relay driver 230. Receipt of the incoming 6 kc. signal at line pulsing relay driver 230 is effective to cause the operation of line pulsing relay 245. Operation of relay 245 opens the telephone line at contacts 246 in accordance with pulses received at the base unit as dialed by the subscriber at dial 185. Because of its slow-to-release characteristics relay 250 remains operated during operation of relay 245 even though 10 kc. signals are not present. Consequently the line remains closed, at contacts 252, to the hybrid network. The opening and closing of the telephone line at contacts 246 is comparable to the pulsing normally provided by operation of the dial and therefore is effective to control switching equipment at a telephone central office in any well known manner.

Between dial pulses and after the completion of dialing 10 kc. signals are again radiated from the extension unit and line seizure relay 250 remains operated. Ring-back tone or busy tone from the telephone central office is returned over the telephone line to the hybrid network and from there extended through the modulator to the base unit transmitter 265 for receipt at the extension unit by receiver 165. These signals are then extended through audio amplifier 145 to receiver 171. When the distant station called by the subscriber at extension 100 answers conversation may now commence. At the completion of the conversation disconnection from the telephone line is accomplished in the manner set forth previously.

For further understanding of the present invention a few of the considerations of a practical embodiment of a wireless extension telephone should be noted.

It has been found practical to mount all the components of the wireless extension unit 100 in a conventional telephone instrument housing. This form of mounting has the psychological advantage over any other design in that subscribers are used to this form and that the novelty of a wireless link between the extension and the paystation is less awesome to the casual subscriber or user than if the extension unit were to bear some other form. The extension unit is powered by batteries preferably of the rechargeable sort. Because of extremely low current requirements battery life has been found to be exceptionally long.

The base unit 200 which in a practical embodiment has also been transistorized for the sake of miniaturization, is powered from a conventional power supply connected to the alternating current mains found in most homes. Alternately it too would be battery powered. Conceivably the instrument might be powered over the telephone line. It has been found practical to operate the system described herein over two radio frequency channels. The first channel existing between the transmitter 265 at the base unit and the receiver at the extension unit and the second between the transmitter 110 at the extension unit and the receiver 210 at the base unit. Usage of two separate channels eliminates the necessity for press to talk switches, voice switching or other means that might be required if a single channel were employed.

Various types of transmitters and receivers may be used at both base and extension units without departing from the scope of the present invention and that the power of the transmitters used and the sensitivity of the receivers used as well as the radio frequencies chosen for use in the present invention will determine the range of operation of which the extension may operate from the base unit.

It is apparent therefore this invention may be embodied in other specific forms without departing from the spirit or essential characteristics thereof. The present embodiment is to be considered in all respects as representative and not restrictive with the scope of the invention being indicated by the appended claims rather than by the foregoing description and all changes which come within the meaning and equivalency of the claims are therefore intended to be embraced therein.

What is claimed is:

1. A subscriber's extension telephone comprising: an extension unit including; an extension unit radio transmitter, line seizure signal generating means connected to said extension unit radio transmitter operated to send modulating seizure signals to said transmitter, line pulsing signal generating means connected to said extension unit radio transmitter operated to send modulating line pulsing signals to said transmitter, voice signal generating means connected to said extension unit radio transmitter operated to send modulating voice signals to said transmitter, said extension unit radio transmitter modulated in response to receipt of modulating signals from one of said signal generating means to transmit said signals; and a base unit connected to a telephone line including; a base unit radio receiver operated in response to modulated signals received from said extension unit radio transmitter, line seizure means connected to said base unit radio receiver and to said telephone line operated in response to receipt of line seizure signals from said base unit radio receiver to connect said telephone line to said base unit radio receiver, line pulsing means connected to said base unit radio receiver and to said telephone line operated in response to pulsing signals from said base unit radio receiver to pulse said telephone line, and voice signal repeating means connected to said base unit radio receiver and to said telephone line operated in response to receipt of voice signals from said base unit radio receiver to send said voice signals to said telephone line.

2. A subscriber's extension telephone comprising: an extension unit including; an extension unit radio transmitter, line seizure signal generating means connected to said extension unit radio transmitter operable to send modulating line seizure signals to said transmitter, line pulsing signal generating means connected to said extension unit radio transmitter operable to send modulating line pulsing signals to said transmitter, voice signal generating means connected to said extension unit radio transmitter operated to send modulating voice signals to said transmitter, a power source, switching means operated to connect said power source to and operate said line seizure signal generating means and said line pulsing signal generating means, said switching means further operated to connect said power source to said extension unit radio transmitter, said extension unit radio transmitter operated in response to connection to said power source and modulated in response to receipt of modulating signals from any one of said signal generating means to transmit said signals; and a base unit connected to a telephone line including; a base unit radio receiver operated in response to modulated signals received from said extension unit radio transmitter, line seizure means connected to said base unit radio receiver and to said telephone line operated in response to receipt of line seizure signals from said base unit radio receiver to connect said telephone line to said base unit radio receiver, line pulsing means connected to said base unit radio receiver and to said telephone line operated in response to pulsing signals from said base unit radio receiver to pulse said telephone line, voice signal repeating means connected to said base unit radio receiver and to said telephone line operated in response to receipt of voice signals from said base unit radio receiver to send said voice signals to said telephone line.

3. A subscriber's extension telephone as claimed in claim 2 wherein said line seizure signal generating means comprise: an oscillator connected to said extension unit radio transmitter operated to generate line seizure signals at an audio frequency and send said signals to said extension unit radio transmitter.

4. A subscriber's extension telephone as claimed in claim 2 wherein said line pulsing signal generating means comprise: an oscillator connectable to said extension unit radio transmitter operated to generate line seizure signals at an audio frequency, and an impulsing device operated to connect said oscillator to said extension unit radio transmitter to send said line pulsing signals to said extension unit radio transmitter.

5. A subscriber's extension telephone as claimed in claim 2 wherein said line seizure means comprise: a band pass filter connected to said base unit radio receiver passing only line seizure signals received from said base unit receiver; a relay; relay driving means connected to said band pass filter and to said relay operated in response to line seizure signals passed by said band pass filter to operate said relay to connect said telephone line to said base unit radio receiver.

6. A subscriber's extension telephone as claimed in claim 2 wherein said line pulsing means comprise: a band pass filter connected to said base unit radio receiver passing only line pulsing signals received from said base unit receiver; a relay; relay driving means connected to said band pass filter and to said relay operated in response to line pulsing signals passed by said band pass filter to operate said pulsing relay to pulse said telephone line.

7. A subscriber's extension telephone as claimed in claim 2 wherein said voice signal repeating means comprise: a reject filter connected to said base unit radio receiver passing voice signals received from said base unit radio receiver and rejecting line seizure signals received from said radio receiver; an audio amplifier connected between said reject filter and said telephone line operated in response to voice signals passed by said reject filter to amplify said voice signals and send said amplified signals to said telephone line.

8. A subscriber's extension telephone comprising: a base unit connected to a telephone line including; a base unit radio transmitter, modulation means, a first power source, ringing signal repeating means connected to said telephone line operated in response to receipt of ringing signals over said telephone line to connect said power source to said transmitter and to said modulation means, said modulation means connected to said telephone line and connected to said transmitter operated in response to connection to said power source and receipt of voice signals or ringing signals over said telephone line to modulate said radio transmitter, said base unit radio transmitter operated in response to connection to said power source and modulation by said modulation means to transmit ringing signals or voice signals; an extension unit including; an extension unit radio receiver operated in response to receipt of ringing signals or voice signals transmitted by said base unit radio transmitter, ringing signal receiving means connected to said extension unit radio receiver operated in response to ringing signals received by said extension unit radio receiver to signal a subscriber, voice signal receiving means connected to said extension unit radio receiver operated in response to voice signals from said receiver to reproduce said signals, a second power source connected to said ringing signal receiving means, connectable to said voice signal receiving means, switching means operated to disconnect said second power source from and disable said ringing signal receiver means and to connect said second power source to and operate said voice signal receiving means.

9. A subscriber's extension telephone as claimed in claim 8 wherein said modulation means comprise: an oscillator operated in response to connection to said power source to generate ringing signals at an audio frequency; and a modulator connected to said base unit radio transmitter, to said oscillator and to said telephone line operated in response to voice signals received over said telephone line or to ringing signals generated by said oscillator to modulate said base unit radio transmitter.

10. A subscriber's extension telephone as claimed in claim 8, wherein said switching means comprise: a hookswitch connected to said second power source, to said ringing signal receiving means, and to said voice signal receiving means; a telephone handset engaging said hookswitch; said hookswitch operated in response to disengaging of said telephone handset to disconnect said second power source from said ringing signal receiving means and to connect said second power source to said voice signal receiving means.

11. A subscriber's extension telephone as claimed in claim 8, wherein said extension unit includes; an extension unit radio transmitter, line seizure signal generating means connected to said extension unit radio transmitter operable to send line seizure signals to said transmitter, line pulsing signal generating means connected to said extension unit radio transmitter operable to send line pulsing signals to said extension unit radio transmitter, voice signal generating means connected to said extension unit radio transmitter operated to send voice signals to said transmitter, said switching means operated to connect said second power source to and operate said voice signal receiving means, said line seizure signal generating means and said line pulsing signal generating means, said switching means further operated to connect said second power source to said extension unit radio transmitter, said extension unit radio transmitter operated in response to connection to said second power source and to receipt of signals from any one of said signal generating means to transmit said signals; said base unit further including; a base unit radio receiver operated in repsonse to signals received from said extension unit radio transmitter, line seizure means connected to said base unit radio receiver and to said telephone line operated in response to receipt of line seizure signals from said base unit radio receiver to connect said telephone line to said base unit radio receiver, line pulsing means connected to said base unit radio receiver and to said telephone line operated in response to pulsing signals from said base unit radio receiver to pulse said telephone line, voice signal repeating means connected to said base unit radio receiver and to said telephone line operated in response to receipt of voice signals from said base unit radio receiver to send said voice signals to said telephone line.

12. A subscriber's extension telephone as claimed in claim 11 wherein said modulation means are connectable to said telephone line, and said line seizure means connected to said base unit radio receiver and to said telephone line are operated in response to receipt of line seizure signals from said base unit radio receiver to connect said telephone line to said base unit radio receiver and to said modulation means.

13. A subscriber's extension telephone as claimed in claim 11 wherein said switching means comprise: a hookswitch connected to said second power source, to said ringing signal receiving means, to said voice signal receiving means, to line seizure signal generating means, to said line pulsing signal generating means, and to said extension unit radio transmitter; a telephone handset engaging said hookswitch; said hookswitch operated in response to disengaging of said telephone handset to disconnect said second power source from said ringing signal receiving means and to connect said second power source to said voice signal receiving means, to said line seizure signal generating means, to said line pulsing signal generating means, and to said extension unit radio transmitter.

14. A subscriber's extension telephone as claimed in claim 11 wherein said base unit further includes: a hybrid network connected to said telephone line, to said voice signal repeating means and to said modulation means operated in response to voice signals received over said telephone line to send said signals to said modulation means and operated in response to voice signals received from said voice signal repeating means to send said voice signals to said telephone line.

15. A subscriber's extension telephone comprising: a base unit connected to a telephone line including; a base unit radio transmitter, modulation means, ringing signal repeating means connected to said telephone line operated in response to receipt of ringing signals over said telephone line to condition said transmitter and said modulation means for operation, said modulation means connected to said telephone line and connected to said transmitter and operated in response to conditioning and receipt of voice signals or ringing signals over said telephone line to modulate said radio transmitter, said base unit radio transmitter operated in response to conditioning and modulation by said modulation means to transmit ringing signals or voice signals; an extension unit including; an extension unit radio receiver operated in response to receipt of ringing signals or voice signals transmitted by said base radio transmitter, ringing signal receiving means connected to said extension unit radio receiver operated in response to ringing signals received by said extension unit radio receiver to signal a subscriber, and voice signal receiving means connected to said extension unit radio receiver operated in response to voice signals from said receiver to reproduce said signals.

16. A subcriber's extension telephone as claimed in claim 15 wherein said extension unit further includes an extension unit radio transmitter, line seizure signal generating means connected to said extension unit radio transmitter operated to send line seizure signals to said transmitter, line pulsing signal generating means connected to said extension unit radio transmitter operated to send line pulsing signals to said extension unit radio transmitter voice signal generating means connected to said extension unit radio transmitter operated to send voice signals to said transmitter, said extension unit radio transmitter operated in response to receipt of signals from any one of said signal generating means to transmit said signals; said base unit further including; a base unit radio receiver operated in response to signals received from said extension unit radio transmitter, line seizure means connected to said base unit radio receiver and to said telephone line operated in response to receipt of line seizure signals from said base unit radio receiver to connect said telephone line to said base unit radio receiver, line pulsing means connected to said base unit radio receiver and to said telephone line operated in response to pulsing signals from said base unit radio receiver to pulse said telephone line, and voice signal repeating means connected to said base unit radio receiver to said telephone line operated in response to receipt of voice signals from said base unit radio receiver to send said voice signals to said telephone line.

17. A subscriber's extension telephone as claimed in claim 15 wherein said ringing signal receiving means comprises: a band pass filter connected to said extension unit radio receiver passing only ringing signals received from said extension unit receiver; a signaling device; and signaling device driving means connected to said band pass filter and to said signaling device operated in response to ringing signals passed by said band pass filter to operate said signaling device to signal a subscriber at said extension telephone.

18. A subscriber's extension telephone instrument as claimed in claim 15 wherein said voice signal receiving means comprise: a receiving transducer, and an audio amplifier connected to said extension unit radio receiver and to said receiving transducer operated in response to voice signals from said extension unit radio receiver to extend said signals to said receiving transducer, to reproduce said voice signals.

References Cited by the Examiner

UNITED STATES PATENTS

| | | | |
|---|---|---|---|
| 1,688,455 | 10/28 | Demarest | 179—41 |
| 2,129,332 | 9/38 | Mastini | 325—55 |
| 2,629,092 | 2/53 | Herrick | 179—41 |
| 2,751,436 | 6/56 | Bakker | 179—41 |
| 2,894,121 | 7/59 | Phillips | 325—64 |

ROBERT H. ROSE, *Primary Examiner.*

WILLIAM C. COOPER, *Examiner.*